(12) United States Patent
Kim

(10) Patent No.: US 9,912,368 B2
(45) Date of Patent: *Mar. 6, 2018

(54) CASE HAVING STANDING LEG FOR ELECTRONIC DEVICES

(71) Applicant: SPIGEN KOREA CO., LTD., Seoul (KR)

(72) Inventor: Dae-Young Kim, Seoul (KR)

(73) Assignee: SPIGEN KOREA CO., LTD., Geumcheon-Gu, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,050

(22) Filed: Apr. 25, 2017

(65) Prior Publication Data

US 2017/0230072 A1    Aug. 10, 2017

Related U.S. Application Data

(63) Continuation-in-part of application No. 14/626,670, filed on Feb. 19, 2015, now Pat. No. 9,677,702, and a continuation-in-part of application No. 15/063,429, filed on Mar. 7, 2016.

(60) Provisional application No. 62/131,709, filed on Mar. 11, 2015, provisional application No. 62/460,801, (Continued)

(51) Int. Cl.
| | |
|---|---|
| *B65D 5/52* | (2006.01) |
| *H04B 1/3888* | (2015.01) |
| *A45C 11/00* | (2006.01) |
| *F16M 11/04* | (2006.01) |
| *F16M 11/10* | (2006.01) |
| *F16M 13/00* | (2006.01) |
| *F16M 13/02* | (2006.01) |

(52) U.S. Cl.
CPC ............ *H04B 1/3888* (2013.01); *A45C 11/00* (2013.01); *F16M 11/041* (2013.01); *F16M 11/10* (2013.01); *F16M 11/105* (2013.01); *F16M 13/00* (2013.01); *F16M 13/022* (2013.01); *A45C 2011/002* (2013.01); *A45C 2011/003* (2013.01); *A45C 2200/15* (2013.01)

(58) Field of Classification Search
CPC ........ B65D 25/20; B65D 25/22; F16M 11/00; A47B 97/04; A47B 97/06; A47B 97/08; H04M 1/0249; H04M 1/0522
USPC .................. 206/736, 45.2, 45.24; 455/575.8; 361/679.56, 679.55
See application file for complete search history.

(56) References Cited

U.S. PATENT DOCUMENTS 7,301,759 B2 *  11/2007  Hsiung ................ H05K 5/0234
                                                                          248/188
2010/0142130 A1 *  6/2010  Wang ...................... H04M 1/04
                                                                          361/679.01

(Continued)

*Primary Examiner* — Steven A. Reynolds
*Assistant Examiner* — Javier A Pagan
(74) *Attorney, Agent, or Firm* — Lucem, PC; Heedong Chae

(57) ABSTRACT

A case, having a standing leg for an electronic device, includes: a soft protective cover for protecting the electronic device installed therein, covering a back portion of the electronic device; a hard protective frame, constructed to removably mount over the soft protective cover; a standing leg for propping up the electronic device; and a recess formed on a back portion of the hard protective frame wherein the standing leg fits in the recess and the standing leg is pivoted with the soft protective cover and the hard protective frame.

22 Claims, 16 Drawing Sheets

Related U.S. Application Data filed on Feb. 18, 2017, provisional application No. 62/063,292, filed on Oct. 13, 2014.

(56) References Cited

U.S. PATENT DOCUMENTS

| | | | |
|---|---|---|---|
| 2011/0228458 A1* | 9/2011 | Richardson | H04M 1/0252 361/679.01 |
| 2012/0088558 A1* | 4/2012 | Song | H04M 1/18 455/575.1 |
| 2012/0199501 A1* | 8/2012 | Le Gette | F16M 11/04 206/45.24 |
| 2014/0128130 A1* | 5/2014 | Chiu | H04M 1/185 455/575.8 |
| 2015/0244408 A1* | 8/2015 | Chen | H04B 1/3888 455/575.8 |

* cited by examiner

CASE HAVING STANDING LEG FOR ELECTRONIC DEVICES

CROSS-REFERENCE TO RELATED APPLICATIONS

This application claims priority to U.S. provisional patent application No. 62/460,801, filed on Feb. 18, 2017. This application is a continuation-in-part of and claims priority to U.S. patent application Ser. No. 14/626,670, filed Feb. 19, 2015, which claims priority to U.S. provisional patent application No. 62/063,292, filed Oct. 13, 2014. The contents of all three parent applications are incorporated herein by reference. Additionally, this application is a continuation-in-part of and claims priority to U.S. patent application Ser. No. 15/063,429, filed Mar. 7, 2016, which claims priority to U.S. provisional patent application No. 62/131,709, filed Mar. 11, 2015. The contents of these two applications are also incorporated herein by reference.

FIELD OF THE INVENTION

The present invention relates to a case having a standing leg for an electronic device and, more particularly, to a smart phone case having a standing leg for propping up the smart phone case. The standing leg is pivoted with both a soft protective cover and a hard protective frame of the case.

BACKGROUND OF THE INVENTION

Mobile electronic devices such as mobile phones, smart phones, tablet computers, and the like are in wide use around the world. A user grips such a device in his hand or hands to use it and uses his fingers to use various applications of the device. However, while using the device, the user may accidentally drop the device thereby causing damage to the device. In addition, use of mobile electronic devices may cause hand, limb and back problems due to the physical stress of holding the electronic device for an extended period of time.

Users of the mobile electronic devices use cases to protect their devices and manufacturers have produced different types of cases to help the users keep their mobile devices safe. However, most of these cases do not allow a user to prop up the mobile device for hands-free viewing at a comfortable angle. Even if such function is allowed, the propping up structure is often complicated and inconvenient.

This application claims priority to U.S. provisional patent application No. 62/460,801, filed on Feb. 18, 2017. This application is a continuation-in-part of and claims priority to U.S. patent application Ser. No. 14/626,670 (the "'670 application"), filed Feb. 19, 2015, which claims priority to U.S. provisional patent application No. 62/063,292, filed Oct. 13, 2014, all three of which are incorporated herein by reference.

The '670 application discloses a case, having a standing leg, which has the advantages that the standing leg or kickstand can be conveniently replaced and that the standing leg or kickstand becomes tightly pivoted with the soft protective cover and the hard protective frame once the electronic device is installed in the case.

However, the case of the '670 application has been found to have the downsides that the standing leg is easily dislodged and the pivoting end protrusions of the standing leg are subject to damage or breakage. The present invention is directed to overcome such downsides.

Therefore, to solve the above problems, there is a need for a case having an easy-to-use standing leg for an electronic device constructed as a simple and durable structure. This invention is directed to solve these problems and satisfy the long-felt need.

SUMMARY OF THE INVENTION

The present invention contrives to solve the disadvantages of the prior art. The present invention provides a case having a standing leg for an electronic device such as a mobile phone, smart phone, tablet computer and the like, and, more particularly, a standing leg pivoted not just with the hard protective frame of the case but also with the soft protective case of the case.

The object of the present invention is to provide a case having a standing leg for an electronic device, comprising: a soft protective cover for protecting the electronic device installed therein, covering a back portion of the electronic device; a hard protective frame, constructed to removably mount over the soft protective cover; a standing leg for propping up the electronic device; and a recess formed on a back portion of the hard protective frame wherein the standing leg fits in the recess and the standing leg is pivoted with the soft protective cover and the hard protective frame.

Another object of the present invention is to provide a case having a standing leg for an electronic device such that the standing leg comprises a metal pin protruding from both sides of a pivoting end of the standing leg wherein the metal pin of the standing leg is pivoted with the soft protective cover and the hard protective frame. The standing leg is preferably manufactured by an over-molding process in which material is over-molded around the metal pin to form the standing leg. Preferably, plastic or polycarbonate is over-molded around the metal pin to form the standing leg.

The advantages of the present invention are: (1) the standing leg or kickstand can be conveniently replaced; (2) the standing leg or kickstand can be easily assembled and disassembled; (3) the standing leg or kickstand becomes tightly pivoted with the soft protective cover and the hard protective frame once the electronic device is installed in the case; (4) the standing leg is not easily dislodged; (5) the metal pin provides a durable pivot connection and the pin is less prone to damage or breakage; (6) the case of the present invention has a simple, stylish structure of a standing leg for propping up the case; (7) the standing leg is easy-to-use and convenient; (8) the standing leg is more durable and less vulnerable to scratches or damages because the standing leg is pivoted not just with the hard protective frame of the case but also with the soft protective case of the case; (9) once a mobile phone is received and secured in the case, the standing leg is very securely pivoted and the opening and closing of the standing leg is very convenient; (10) the soft protective cover, hard protective frame and standing leg are very easy to assemble and the standing leg can be easily removed and replaced; (11) the surface of the standing leg is flush with the surface of the hard protective frame and the appearance and finish are stylish; and (12) the standing leg can be opened easily and conveniently with a fingernail.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

This application claims priority to U.S. provisional patent application No. 62/460,801, filed on Feb. 18, 2017. This application is a continuation-in-part of and claims priority to U.S. patent application Ser. No. 14/626,670, filed Feb. 19, 2015, which claims priority to U.S. provisional patent application No. 62/063,292, filed Oct. 13, 2014. The contents of all three parent applications are incorporated herein by reference. Additionally, This application is a continuation-in-part of and claims priority to U.S. patent application Ser. No. 15/063,429, filed Mar. 7, 2016, which claims priority to U.S. provisional patent application No. 62/131,709, filed Mar. 11, 2015. The contents of these two applications are also incorporated herein by reference.

Figure 1:
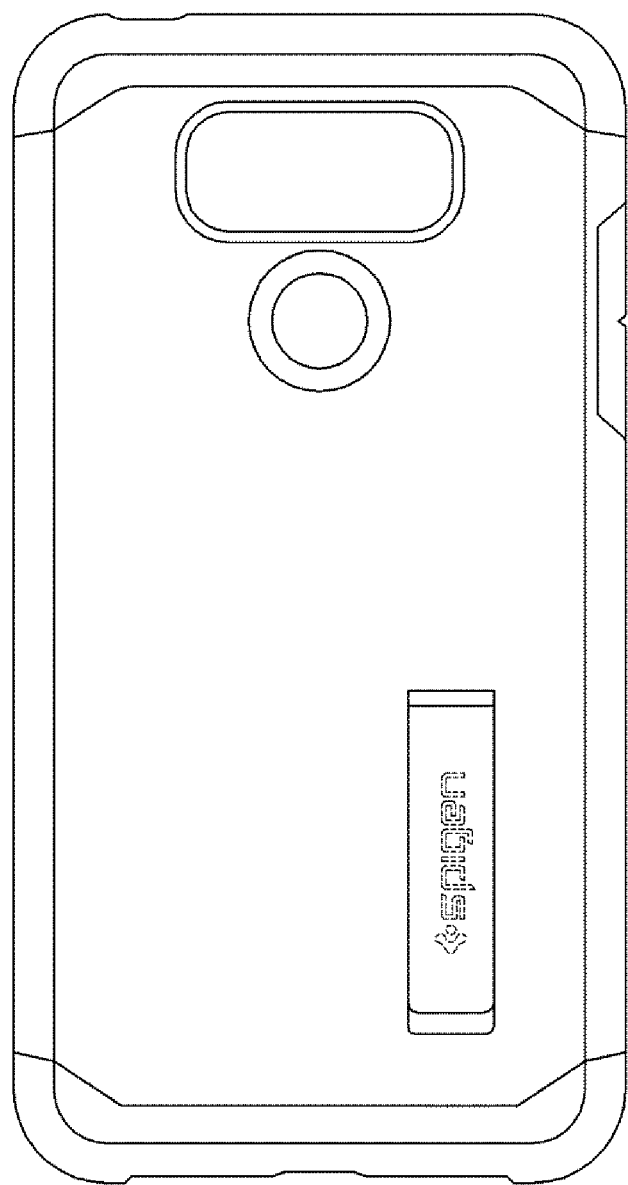
FIG. 1 shows a rear elevational view of a case having a standing leg according to one embodiment of the present invention.
Figure 2:
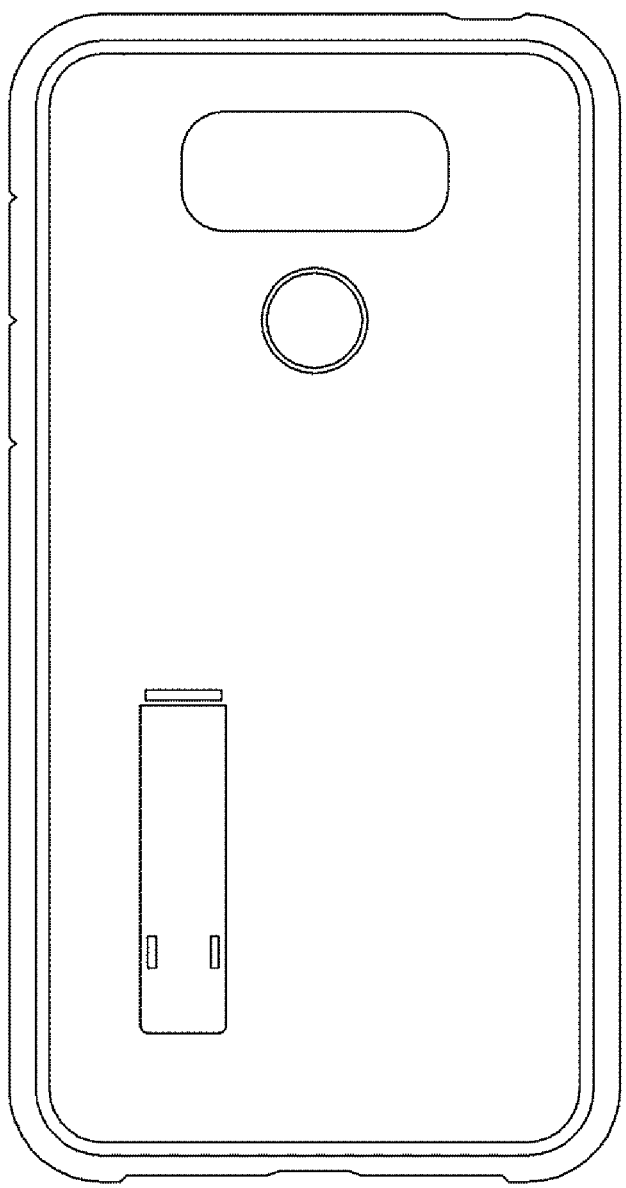
FIG. 2 shows a front elevational view of the case with the standing leg in an open position according to the present invention.
Figure 3:
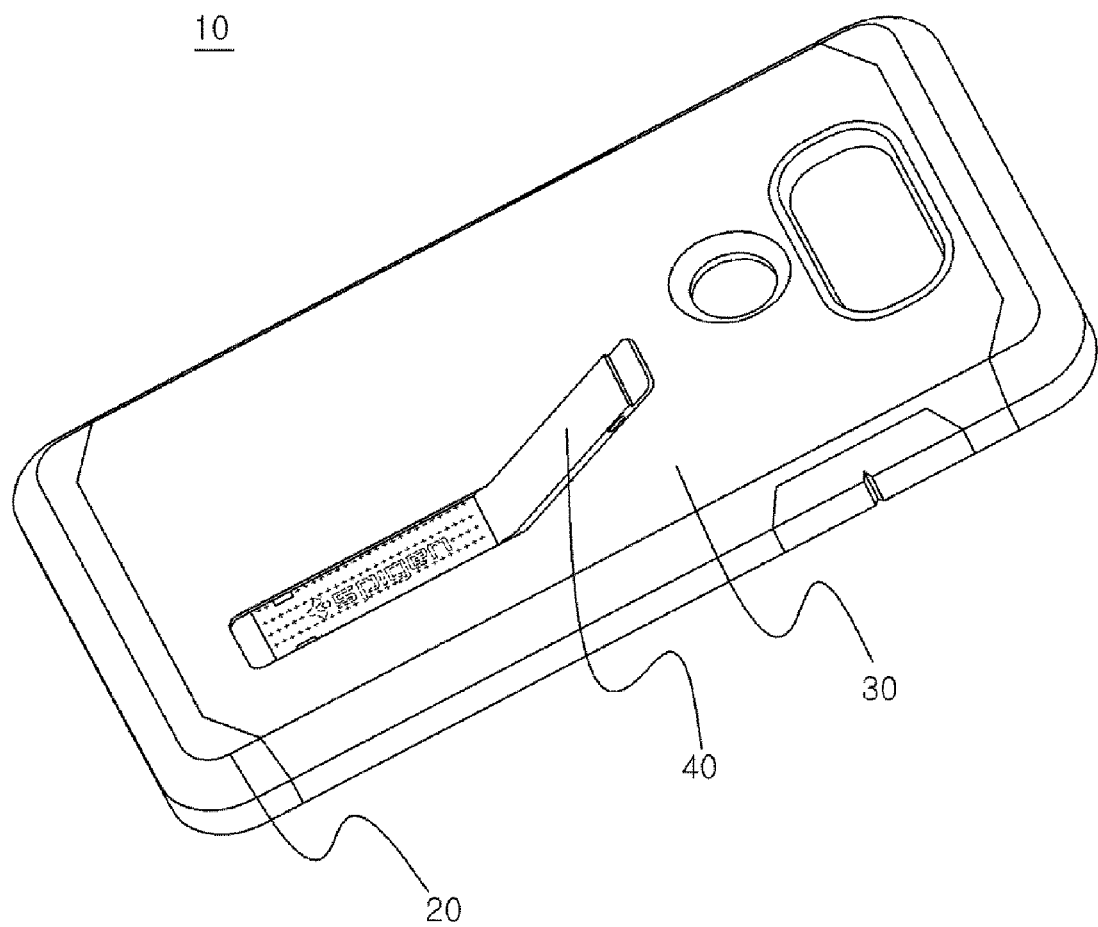
FIG. 3 shows a perspective view of the case with the standing leg open to prop up the case and an electronic device therein.
Figure 4:
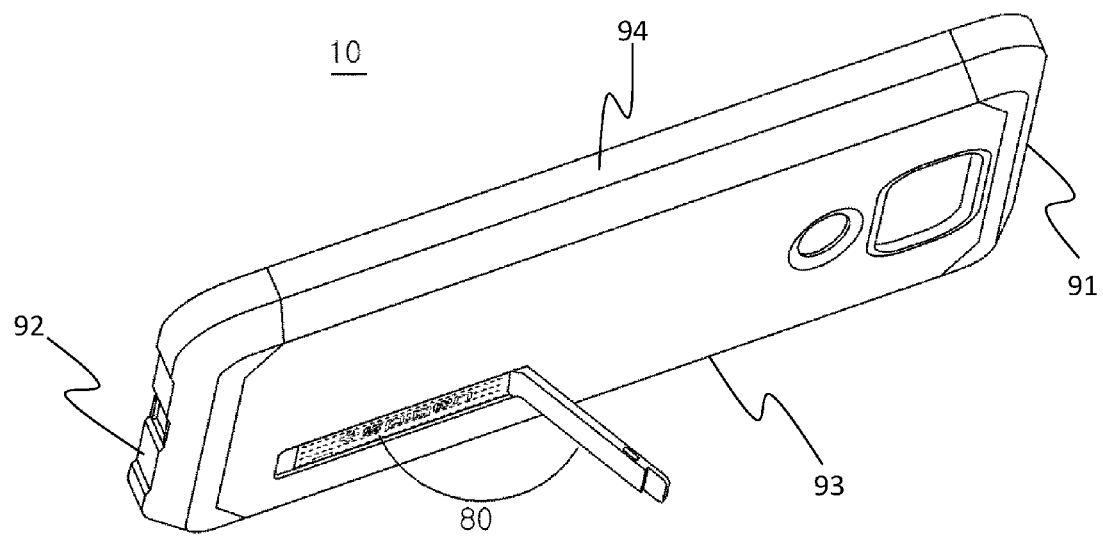
FIG. 4 shows a perspective view of the case with the standing leg open to prop up the case and an electronic device therein in a landscape orientation.

FIGS. 1 and 2 show rear and front elevational views, respectively, of a case 10 having a soft protective cover 20, a hard protective frame 30, and a standing leg 40 in a closed position. FIG. 3 is a perspective view of the case 10 when the standing leg 40 is in an open position. FIG. 4 is another perspective view of the case 10 when the standing leg is in an open position to prop up the case 10 and an electronic device 100 (not shown) therein in a landscape orientation. The electronic device may be a mobile phone, smart phone, tablet computer, MP3 player, personal digital assistant, or the like.

The standing leg 40 may be constructed to rotate up to a predetermined angle 80. The predetermined angle 80 may preferably be more than 90 degrees as shown in FIG. 4. However, if the kickstand 40 is constructed to pivot in a widthwise direction of the case, the predetermined angle 80 may preferably be less than 90 degrees.

Figure 5:
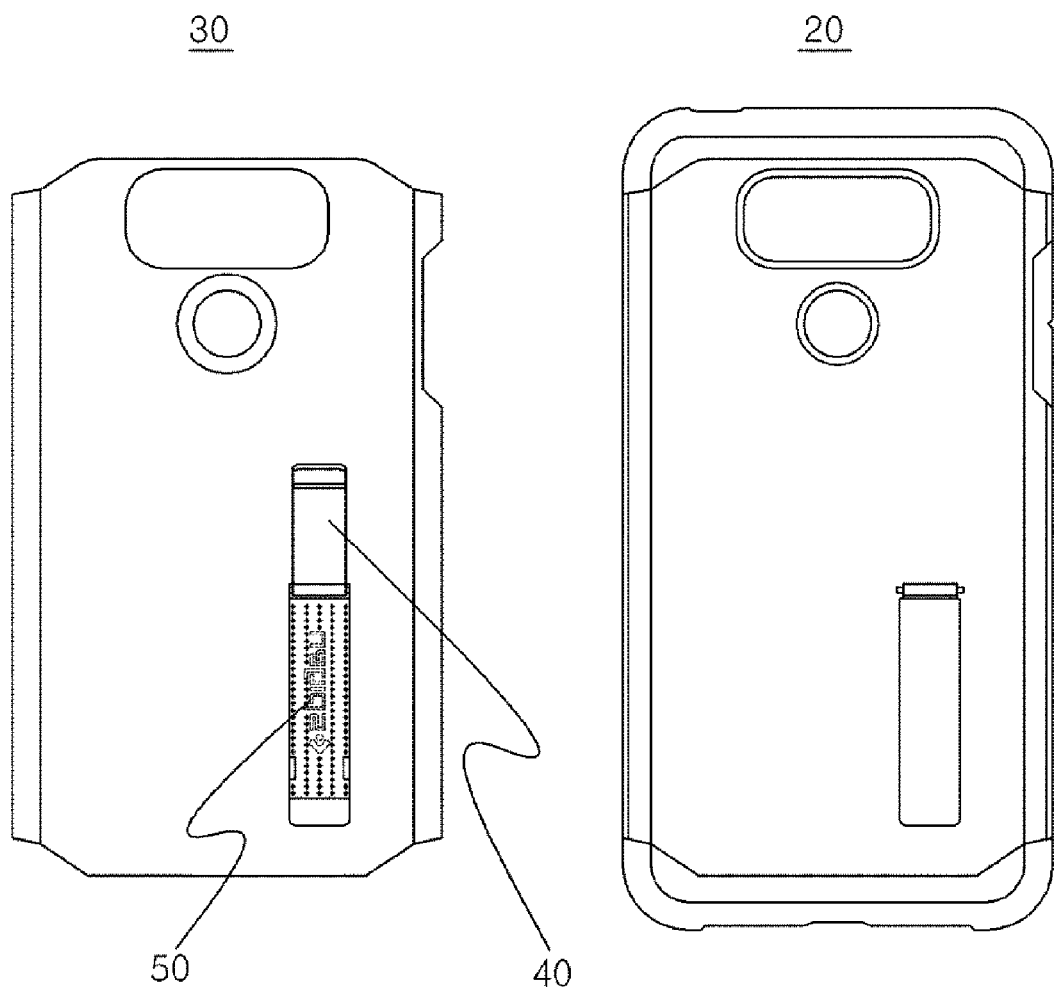
FIG. 5 shows an exploded rear view of the case having a soft protective cover, a hard protective frame and a standing leg with the standing leg open according to the present invention.
Figure 6:
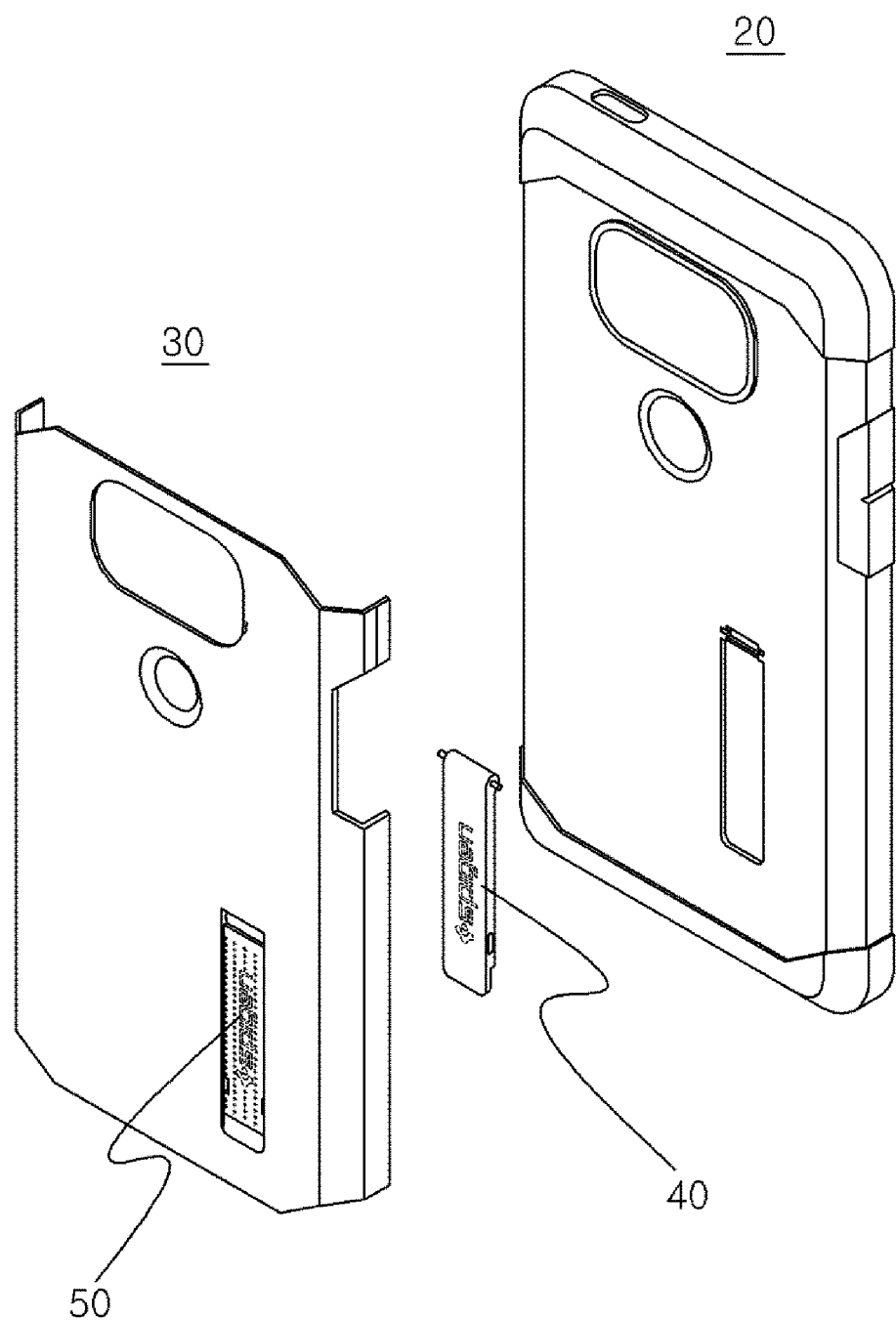
FIG. 6 shows an exploded perspective view of the case having a soft protective cover, a hard protective frame and a standing leg with the standing leg removed according to the present invention.
Figure 7:
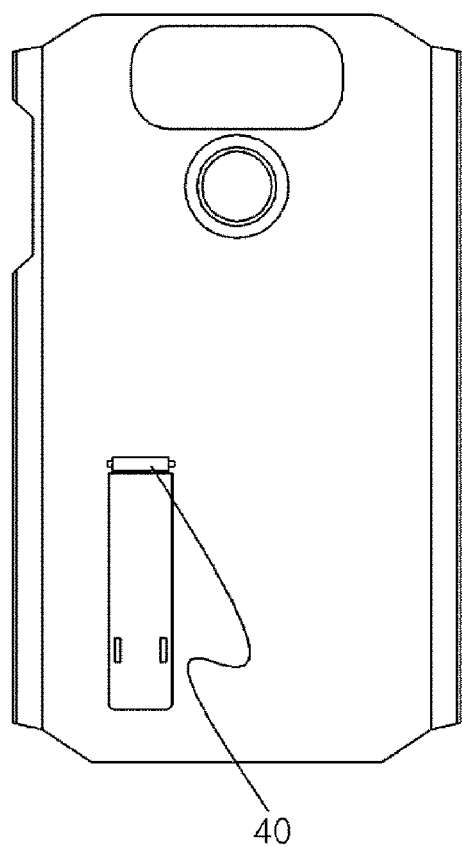
FIG. 7 shows an exploded front view of the case having a soft protective cover, a hard protective frame and a standing leg with the standing leg closed according to the present invention.
Figure 7:
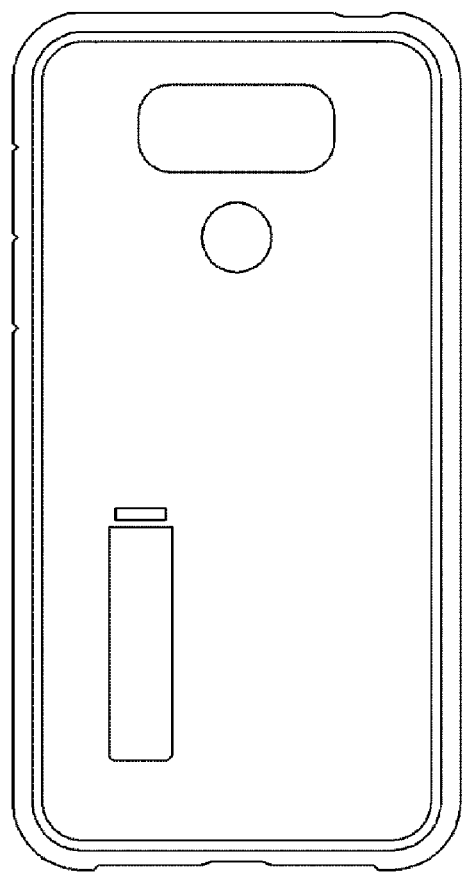

As shown in the exploded views of FIGS. 5-7, a case 10 having a standing leg 40 for an electronic device 100, may include: a soft protective cover 20 for protecting the electronic device 100 (not shown) installed therein, covering a back portion 110 of the electronic device 100; a hard protective frame 30, constructed to removably mount over the soft protective cover 20; a standing leg 40 for propping up the electronic device 100; and a recess 50 formed on a back portion 31 of the hard protective frame 30 wherein the standing leg 40 fits in the recess 50 and the standing leg 40 is pivoted with the soft protective cover 20 and the hard protective frame 30.

Figure 8:
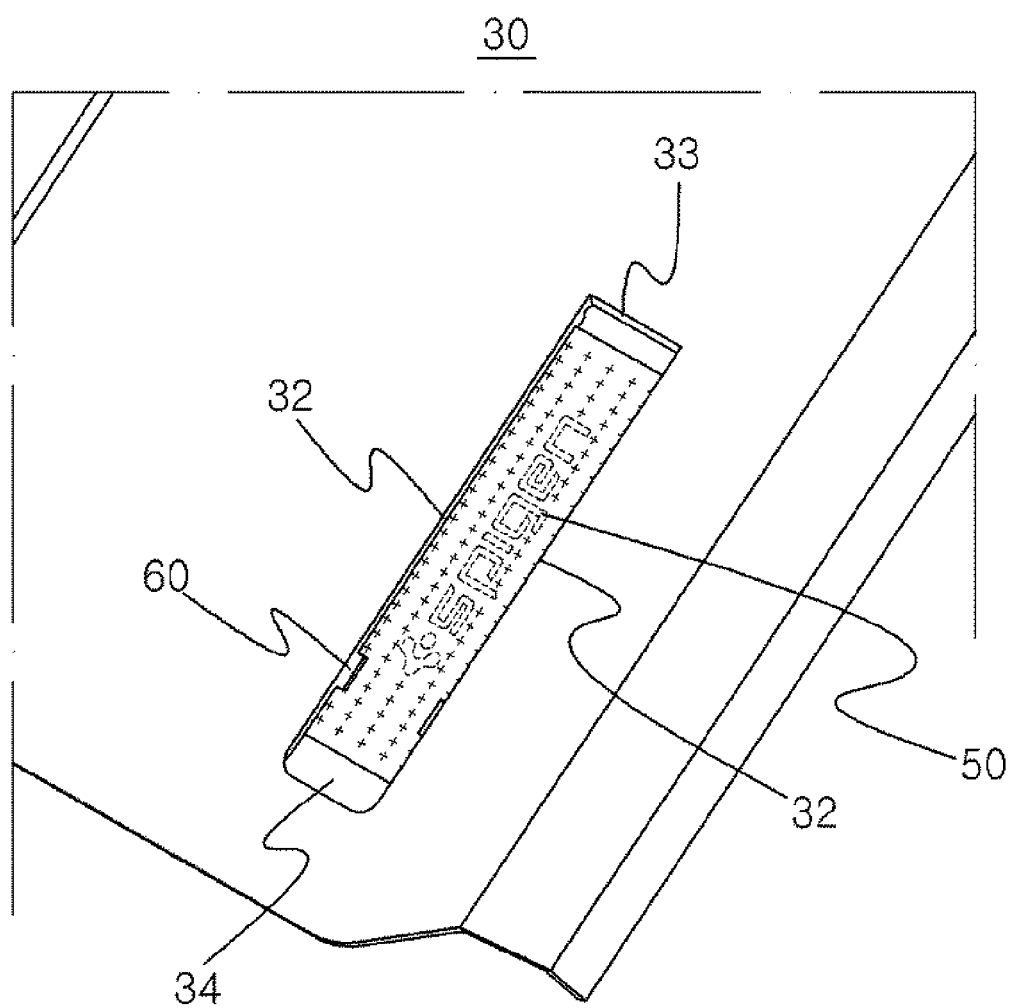
FIG. 8 shows an enlarged rear perspective view of the hard protective frame.
Figure 9:
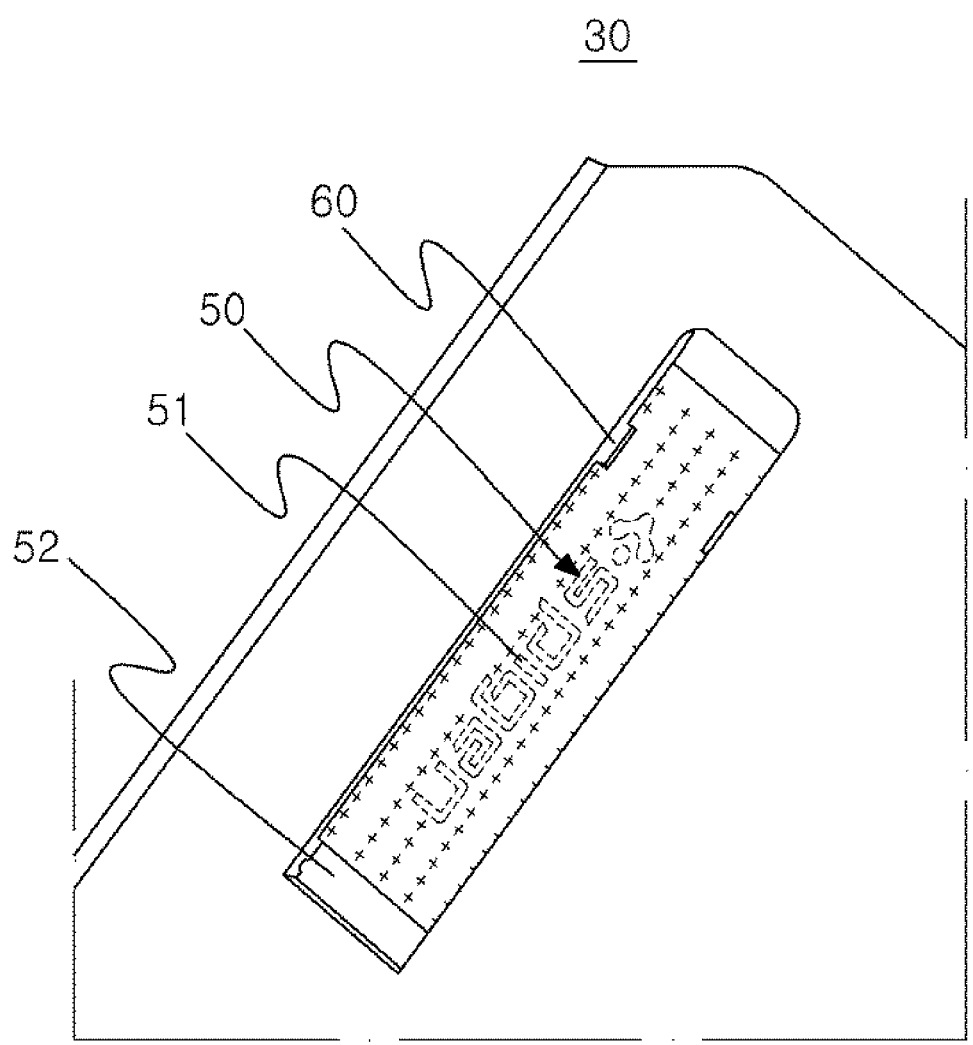
FIG. 9 shows another enlarged rear perspective view of the hard protective frame.

FIGS. 8 and 9 are enlarged rear perspective views of the hard protective frame 30 having the recess 50. The recess 50 of the hard protective frame 30 may include a recess bottom 51 and a recess bottom opening 52 which may be formed on a bottom of the recess 50 and next to the recess bottom 51, wherein the recess bottom opening 52 may be sized to allow insertion of the standing leg 40. An emblem, a trademark, a slogan, or an insignia may be formed on the recess bottom 51. The recess 50 may include a pivoting end wall 33, two side walls 32, and a distal end wall 34. The standing leg 40 may be removed and replaced.

Figure 10:
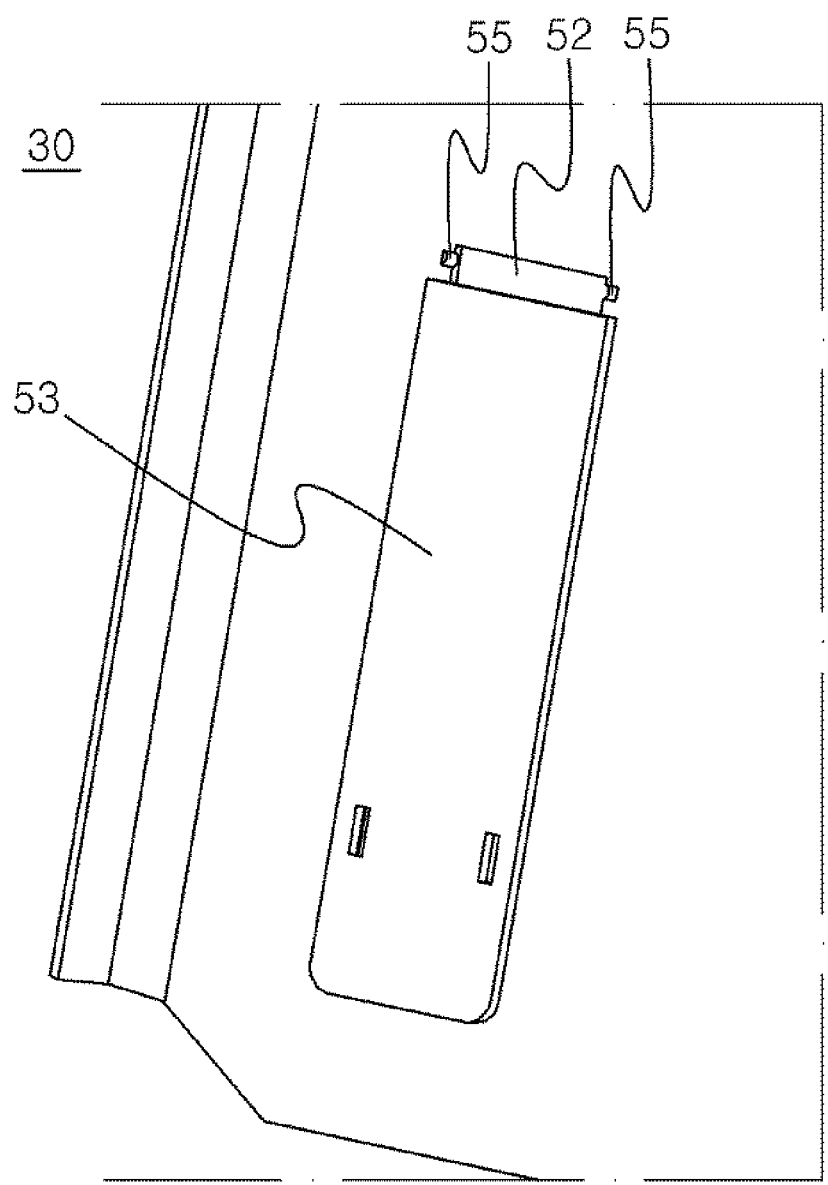
FIG. 10 shows an enlarged front perspective view of the hard protective frame.

In addition, pivoting grooves 55 of the hard protective frame 30, may be formed on both ends of the recess bottom opening 52, as shown in the enlarged front view of FIG. 10. Because of the recess bottom 51, the standing leg 40 may not become easily dislodged when the case 10 is installed on the electronic device 100. Also shown in FIG. 10 is a protrusion 53 corresponding to the recess 50, which may be formed on a front portion of the hard protective frame 30.

Figure 11:
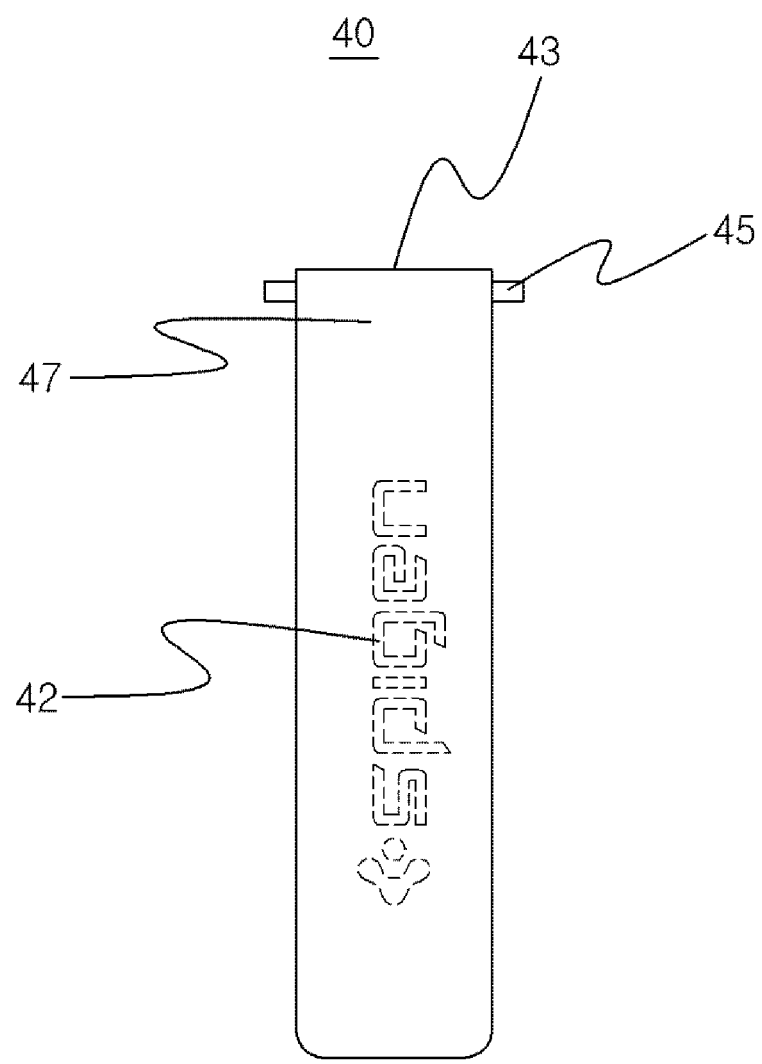
FIG. 11 shows a rear elevational view of the standing leg.
Figure 12:
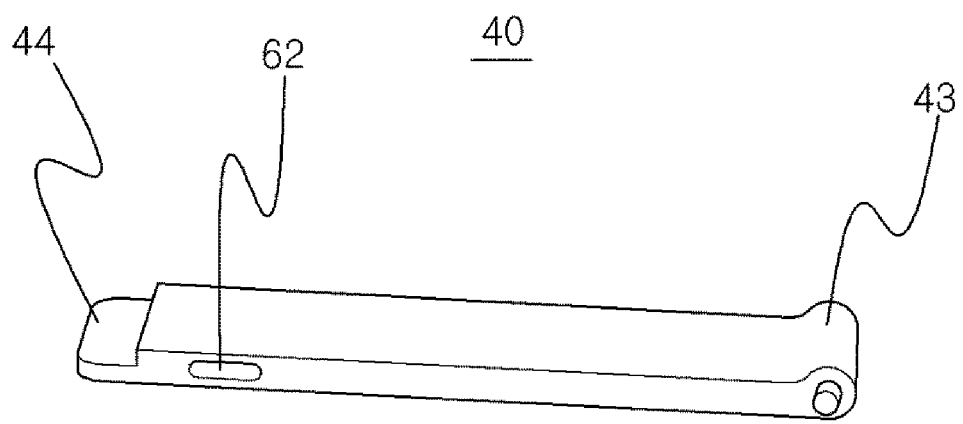
FIG. 12 shows a perspective view of the standing leg.

As shown in the enlarged views of the standing leg 40 in FIGS. 11 and 12, the standing leg 40 may include a metal pin 45 protruding from both sides of a pivoting end 43 of the standing leg 40 wherein the pin 45 of the standing leg 40 is pivoted with the soft protective cover 20 and the hard protective frame 30. Alternatively, two metal pins 45 may respectively protrude on both sides of the pivoting end 43 of the standing leg 40.

Two ends of the metal pin 45 may be partially received by the pivoting grooves 55 of the hard protective frame 30. The two ends of the metal pin 45 of the standing leg 40 may also be partially received in pivoting grooves 27 of the soft protective cover 20.

The standing leg 40 may be constructed to rotate up to a predetermined angle 80 until a contact part 47 of the outer surface 42 of the standing leg 40 contacts the pivoting end wall 33 of the hard protective frame 30, shown in FIG. 8.

The standing leg 40 may include an inner surface 41 and an outer surface 42. The contact part 47 may be sloped and the pivoting end wall 33 of the recess 50 may be sloped such that the contact part 47 is in planar contact with the pivoting end wall 33 when the standing leg 40 is rotated up to the predetermined angle 80.

Preferably, the standing leg 40 may be manufactured by an over-molding process in which material is over-molded around the metal pin 45. Preferably, plastic or polycarbonate is over-molded around the metal pin 45 to form the standing leg 40.

By this over-molding process, the pivoting end 43 of the standing leg 40 can be slim and durable and the metal pin 45 may not easily slip out of the standing leg 40. Since the pivot is made of metal pin, it is less prone to damage or breakage. There may be two metal pins and the standing leg 40 may be made by an over-molding process. The metal pin may be made of steel, aluminum, another metal, or a metal alloy.

Alternatively, the metal pin may be mechanically inserted into a hole formed in the pivoting end 43, or two metal pins may be mechanically and respectively inserted into holes formed in the pivoting end 43.

A mating protrusion 60 may be formed on the side wall 32 of the hard protective frame 30 as shown in FIG. 9 and a mating cavity 62 may be formed on the standing leg 40 as shown in FIG. 12 wherein the mating protrusion 60 may be constructed to mate with the mating cavity 62. Preferably, there may be two mating protrusions 60 and two mating cavities 62.

Alternatively, a mating protrusion 60 may be formed on the standing leg 40 and a mating cavity 62 may be formed on the side wall 32 wherein the mating protrusion 60 may be constructed to mate with the mating cavity 62. Preferably, there may be two mating protrusions 60 and two mating cavities 62.

An emblem, a trademark, a slogan, or an insignia may be formed on the inner surface 41 of the standing leg 40. An emblem, a trademark, a slogan, or an insignia may be formed on the outer surface 42 of the standing leg 40.

Figure 13:
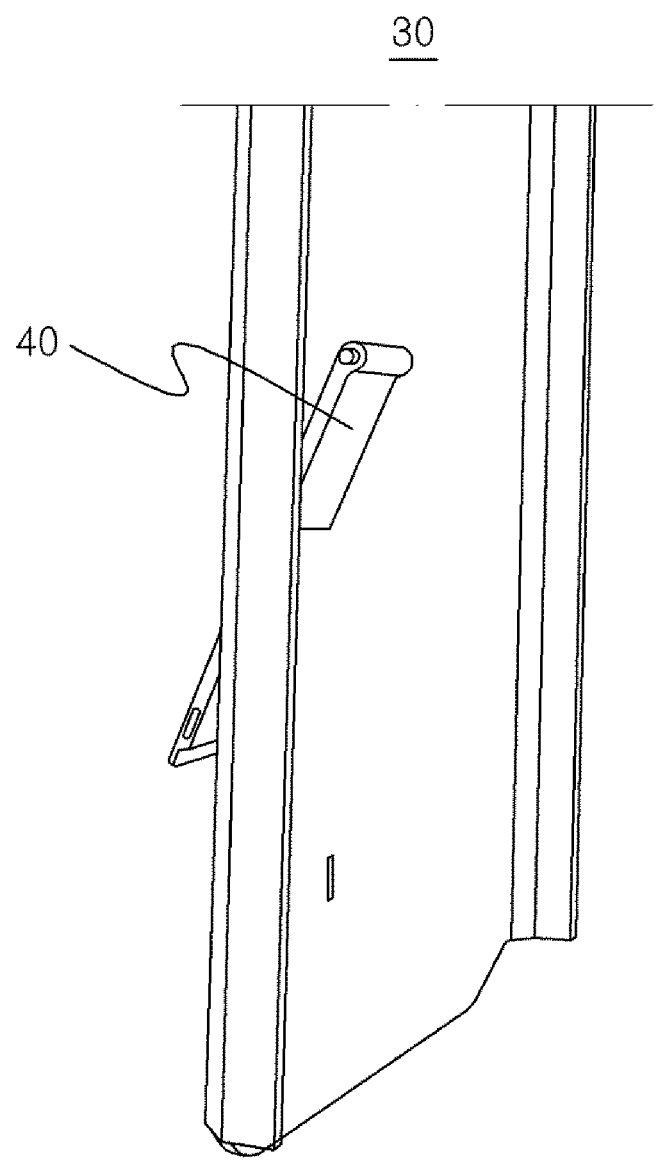
FIG. 13 shows an enlarged view of the standing leg being inserted into the recess bottom opening of the hard protective frame.

FIG. 13 shows the standing leg 40 partially inserted through the recess bottom opening 52 of the hard plastic frame 30. The standing leg 40 may be of a size corresponding to the recess bottom opening 52.

Figure 14:
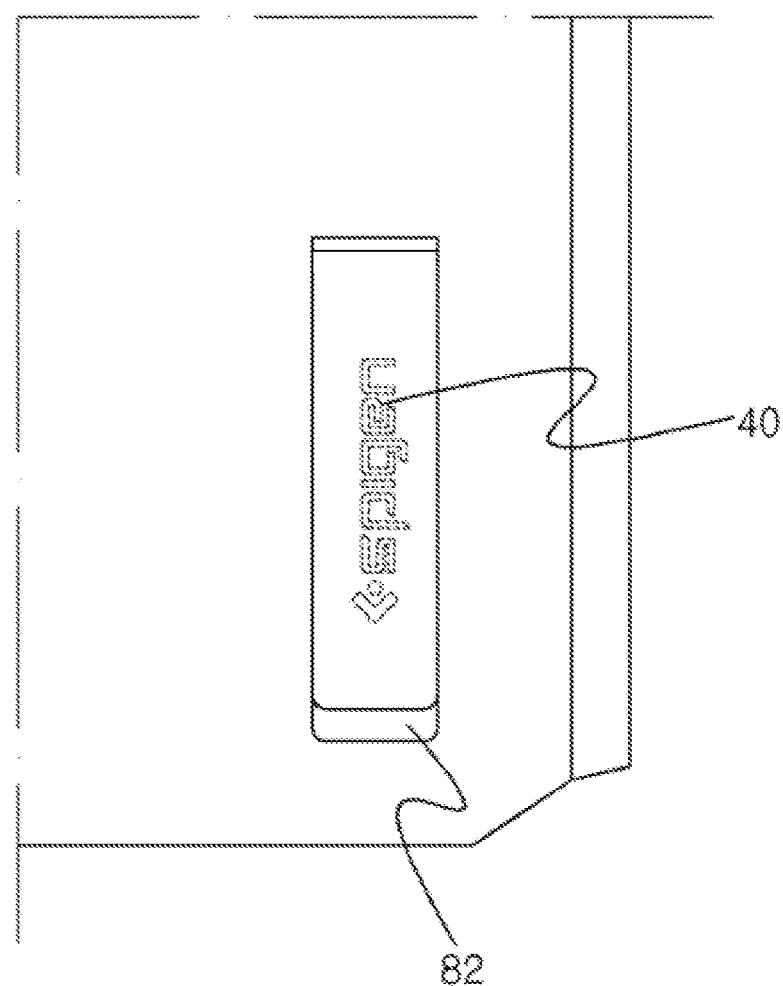
FIG. 14 shows an enlarged rear view of the standing leg fully inserted into the recess bottom opening and in a closed position in the recess of the hard protective frame.
Figure 16:
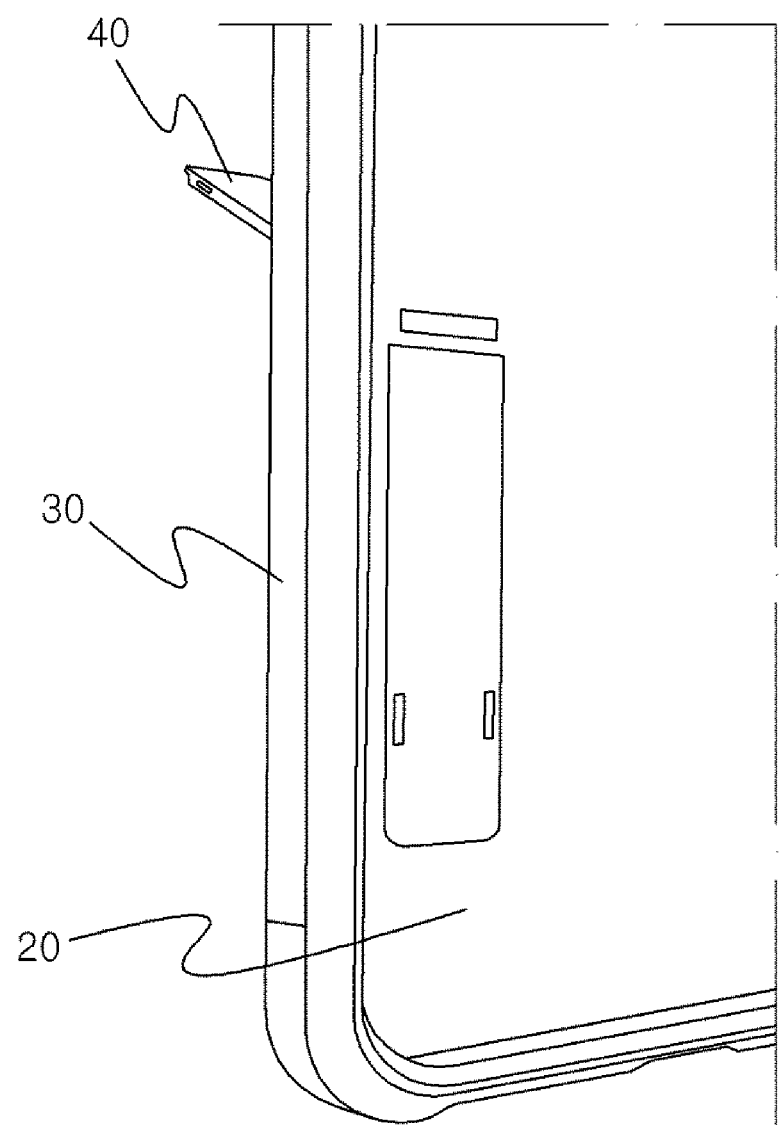
FIG. 16 shows an enlarged front perspective view of the soft protective cover, the standing leg and the hard protective frame assembled together with the standing leg open.

FIG. 14 shows an enlarged view of the kickstand 40 in a closed position. The pivoting end 43 of the kickstand 40 may be curved from the flat portion of the standing leg 40 and received in the pivot opening 25 of the soft protective cover 20 (shown in FIG. 16). The distal end wall 34 may be sloped and there may be a gap 82 between the distal end wall 34 and a distal end 44 of the standing leg 40 for easy insertion of a user's fingernail into the gap 82 to open the standing leg 40.

A recess, a step, or a slope may be formed on the distal end 44 of the standing leg 40 for easy insertion of a user's fingernail into the gap 82 to open the standing leg 40.

Figure 15:
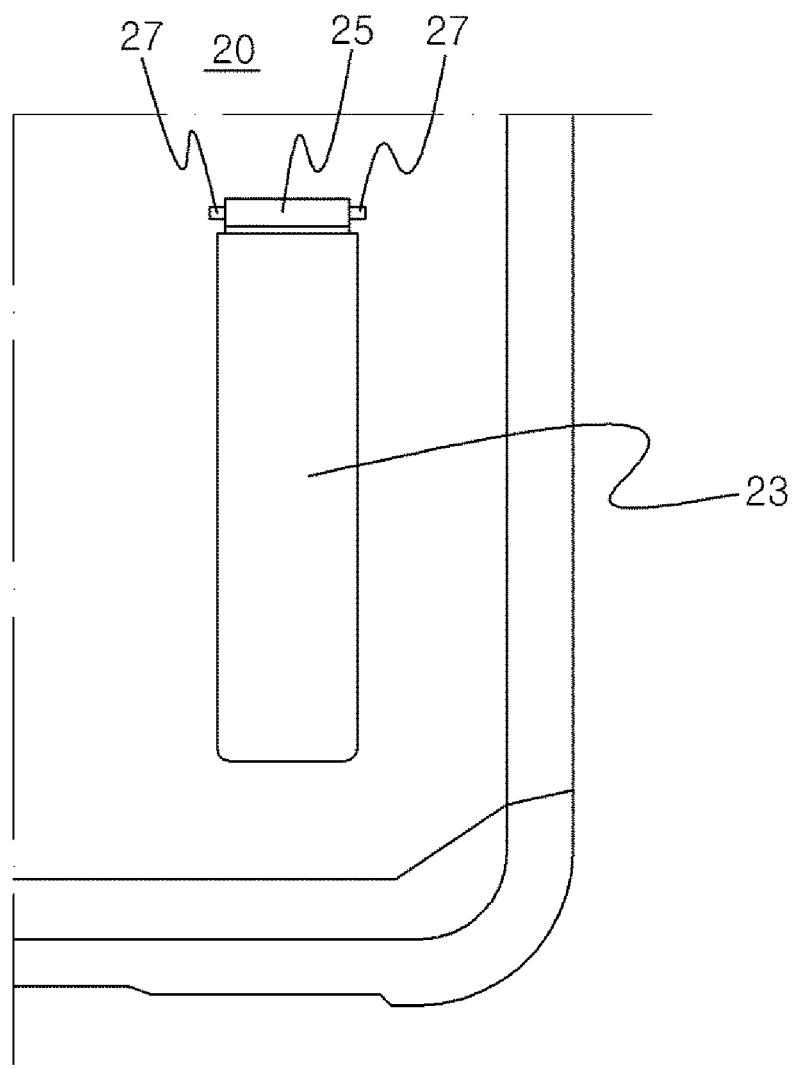
FIG. 15 shows the pivot opening and the protrusion receiving opening of the soft protective cover.

The standing leg 40 may include a pivoting end 43 and the soft protective cover 20 may include a pivot opening 25 to receive the pivoting end 43 wherein the pivoting grooves 27 of the soft protective cover 20 are formed on both ends of the pivot opening 25, as shown in FIG. 15. Since the pivoting end 43 is received in the pivot opening 25, the case can be compact and slim.

The standing leg 40 may be constructed to be pivoted with the soft protective cover 20 and the hard protective frame 30 such that the standing leg 40 is loosely pivoted when the electronic device 100 is not installed in the case 10, but the standing leg 40 is tightly pivoted when the electronic device 100 is installed in the case 10. Once the electronic device 100 is installed in the case 10, friction between the metal pin 45 and the pivoting grooves 27 and 55 may increase because the electronic device 100 exerts pressure on the soft protective cover 20 and squeezes the pivoting grooves 27 and 55 against ends of the metal pin 45. Due to the increased friction and the pressure, the assembly of the soft protective cover 20, the standing leg 40, and the hard protective frame 30 may become more snug and secured, and the standing leg 40 may be well secured in between the soft protective cover 20 and the hard protective frame 30 and may not become easily dislodged.

As additionally shown in FIG. 15, a protrusion receiving opening 23 may be formed on the soft protective cover 20 to receive the protrusion 53 wherein the protrusion 53 may be substantially flush or co-planar with the soft protective cover 20. The standing leg 40 may be substantially flush or co-planar with the hard protective frame 30 as well.

The pivoting grooves 55 of the hard protective frame 30 and the pivoting grooves 25 of the soft protective cover may be circular and preferably semi-circular as shown in FIGS. 10 and 15.

The soft protective cover 20 may be made of a soft material and the hard protective frame 30 may be made of a hard material. Preferably, the hard protective frame 30 may be made of polycarbonate, polyvinyl chloride (PVC), titanium, aluminum, a graphite composite, another metal, or another plastic. More preferably, the soft protective cover 20 may be made of thermoplastic polyurethane and the hard protective frame 30 may be made of polycarbonate.

The standing leg 40 is configured to rotate up to about a predetermined angle 80. As shown in FIG. 4, the soft protective cover 20 includes a top side 91, a bottom side 92, a first side 93 and a second side 94 in which the top and bottom sides 91, 92 of the soft protective cover 20 face each other, the first and second sides 93, 94 of the soft protective cover 20 face each other, and the first and second sides 93, 94 of the soft protective cover 20 are longer than the top and bottom sides 91, 92 of the soft protective cover 20. Preferably as shown in FIG. 4, the recess 50 is formed on a location of the hard protective frame 30 closer to the bottom side 92 of the soft protective cover 20 than the top side 91 of the soft protective cover 20, and additionally, the recess 50 is formed on a location of the hard protective frame 30 closer to the first side 93 of the soft protective cover 20 than the second side 94 of the soft protective cover 20. The distal end 44 of the standing leg 40 is closer to the bottom side 92 of the soft protective cover 20 than a pivoting end 43 of the standing leg 40. Furthermore, the recess 50 is formed substantially parallel to the first and second sides 93, 94 of the soft protective cover 20. The predetermined angle 80 is greater than 90 degrees. In this construction, location and orientation of the standing leg 40, the pivoting end 43 of the standing leg 40 is located close to the middle of the first side 93 of the soft protective cover 20, and the standing leg 40 does not rotate back toward the recess 50 while propping up the case 10 and the electronic device 100 because of the weight of the case 10 and the electronic device 100. The weight presses the standing leg 40 to rotate away from the recess 50.

Alternatively, the standing leg 40 may be constructed in another orientation where the standing leg 40 is parallel to the top and bottom sides 91, 92 of the soft protective cover 20. Here, the standing leg 40 is configured to rotate up to about a predetermined angle 80. The soft protective cover 20 comprises a top side 91, a bottom side 92, a first side 93 and a second side 94 such that the top and bottom sides 91, 92 of the soft protective cover 20 face each other, the first and second sides 93, 94 of the soft protective cover 20 face each other, and the first and second sides 93, 94 of the soft protective cover 20 are longer than the top and bottom sides 91, 92 of the soft protective cover 20. Furthermore, the recess 50 is formed substantially parallel to the top and bottom sides 91, 92 of the soft protective cover 20. The predetermined angle 80 is smaller than 90 degrees in order to provide a proper viewing angle of the electronic device 100. For the predetermined angle 80 to be smaller than 90 degrees, the angle between the pivoting end wall 33 and the recess bottom 51 of the hard protective frame 30 needs to be a sharp one, smaller than 90 degrees.

In the alternative embodiment, the case 10 having a standing leg 40 for an electronic device 100 may comprise: a soft protective cover 20 for protecting the electronic device 100 installed therein, covering a back portion 110 of the electronic device 100; a hard protective frame 30, constructed to removably mount over the soft protective cover 20; a standing leg 40 for propping up the electronic device 100; and a recess 50 formed on a back portion 31 of the hard protective frame 30 wherein the standing leg 40 fits in the recess 50 and the standing leg 40 is pivoted with the soft protective cover 20 and the hard protective frame 30. The standing leg 40 comprises projections (not shown) protruding from both sides of a pivoting end 43 of the standing leg 40 wherein the projections of the standing leg 40 are pivoted with the soft protective cover 20 and the hard protective frame 30. The standing leg 40 is constructed into one-piece, including the projections, and preferably, the standing leg 40 is made by single molding.

The standing leg 40 is constructed to be pivoted with the soft protective cover 20 and the hard protective frame 30 such that installing the electronic device 100 in the case increases resistance to the pivoting of the standing leg 40.

The projections of the standing leg 40 are respectively received in pivoting grooves 27 of the soft protective cover 20 and pivoting grooves 55 of the hard protective frame 30, and the soft protective cover 20 comprises a pivot opening 25 to receive the pivoting end 43 of the standing leg 40 wherein the pivoting grooves 27 of the soft protective cover 20 are formed on both ends of the pivot opening 25.

The recess 50 of the hard protective frame 30 comprises a recess bottom 51 and a recess bottom opening 52 which is formed on a bottom of the recess 50 and next to the recess bottom 51, wherein the recess bottom opening 52 is sized to allow insertion of the standing leg 40. Pivoting grooves 55 of the hard protective frame 30 are formed on both ends of the recess bottom opening 52 to receive the projections of the standing leg 40. A protrusion 53 corresponding to the recess 50 is formed on a front portion of the hard protective frame 30, and a protrusion receiving opening 23 is formed on the soft protective cover 20 to receive the protrusion 53.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case (10) having a standing leg (40) for an electronic device (100), comprising:
   a soft protective cover (20) for protecting the electronic device (100) installed therein, covering a back portion (110) of the electronic device (100);
   a hard protective frame (30), constructed to removably mount over the soft protective cover (20);
   a standing leg (40) for propping up the electronic device (100); and
   a recess (50) formed on a back portion (31) of the hard protective frame (30) wherein the standing leg (40) fits in the recess (50) and the standing leg (40) is pivoted with the soft protective cover (20) and the hard protective frame (30),
   wherein the recess (50) of the hard protective frame (30) comprises a recess bottom (51) and a recess bottom opening (52) which is formed on a bottom of the recess (50) and next to the recess bottom (51), wherein the recess bottom opening (52) is sized to allow insertion of the standing leg (40).

2. The case (10) of claim 1, wherein the standing leg (40) comprises a metal pin (45) protruding from both sides of a pivoting end (43) of the standing leg (40) wherein the pin (45) of the standing leg (40) is pivoted with the soft protective cover (20) and the hard protective frame (30).

3. The case (10) of claim 2, wherein both ends of the metal pin (45) of the standing leg (40) are respectively received in pivoting grooves (27) of the soft protective cover (20) and pivoting grooves (55) of the hard protective frame (30).

4. The case (10) of claim 3, wherein the soft protective cover (20) comprises a pivot opening (25) to receive the pivoting end (43) of the standing leg (40) wherein the pivoting grooves (27) of the soft protective cover (20) are formed on both ends of the pivot opening (25).

5. The case (10) of claim 2, wherein the standing leg (40) is manufactured by an over-molding process in which material is over-molded around the metal pin (45).

6. The case (10) of claim 1, wherein pivoting grooves (55) of the hard protective frame (30) are formed on both ends of the recess bottom opening (52) to receive a metal pin (45).

7. The case (10) of claim 1, wherein a protrusion (53) corresponding to the recess (50) is formed on a front portion of the hard protective frame (30).

8. The case (10) of claim 7, wherein a protrusion receiving opening (23) is formed on the soft protective cover (20) to receive the protrusion (53) wherein the protrusion (53) is substantially flush or co-planar with the soft protective cover (20).

9. The case (10) of claim 1, wherein the standing leg (40) is substantially flush or co-planar with the hard protective frame (30).

10. The case (10) of claim 1, wherein the standing leg (40) is constructed to be pivoted with the soft protective cover (20) and the hard protective frame (30) such that installing the electronic device (100) in the case increases resistance to the pivoting of the standing leg (40).

11. The case (10) of claim 1, wherein the standing leg (40) comprises an inner surface (41) and an outer surface (42), wherein the recess (50) comprises a pivoting end wall (33), two side walls (32) and a distal end wall (34).

12. The case (10) of claim 11, wherein the standing leg (40) is constructed to rotate up to a predetermined angle (80) until a contact part (47) of the outer surface (42) contacts the pivoting end wall (33).

13. The case (10) of claim 12, wherein the contact part (47) is sloped and the pivoting end wall (33) is sloped such that the contact part (47) is in planar contact with the pivoting end wall (33) when the standing leg (40) is rotated about the predetermined angle (80).

14. The case (10) of claim 11, wherein a mating protrusion (60) is formed on the side wall (32) and a mating cavity (62) is formed on the standing leg (40) wherein the mating protrusion (60) is constructed to mate with the mating cavity (62).

15. The case (10) of claim 11, wherein a mating protrusion (60) is formed on the standing leg (40) and a mating cavity (62) is formed on the side wall (32) wherein the mating protrusion (60) is constructed to mate with the mating cavity (62).

16. The case (10) of claim 11, wherein the distal end wall (34) is sloped and there is a gap (82) between the distal end wall (34) and a distal end (44) of the standing leg (40) for easy insertion of a user's fingernail into the gap (82) to open the standing leg (40), wherein a recess, a step, or a slope is formed on the distal end (44) of the standing leg (40) for easy insertion of a user's fingernail into the gap (82) to open the standing leg (40).

17. The case (10) of claim 1, wherein the standing leg (40) is configured to rotate up to about a predetermined angle (80),
wherein the soft protective cover (20) comprises a top side (91), a bottom side (92), a first side (93) and a second side (94),
wherein the top and bottom sides (91, 92) of the soft protective cover (20) face each other, the first and second sides (93, 94) of the soft protective cover (20) face each other, and the first and second sides (93, 94) of the soft protective cover (20) are longer than the top and bottom sides (91, 92) of the soft protective cover (20),
wherein the recess (50) is formed on a location of the hard protective frame (30) closer to the bottom side (92) of the soft protective cover (20) than the top side (91) of the soft protective cover (20),
wherein the recess (50) is formed on a location of the hard protective frame (30) closer to the first side (93) of the soft protective cover (20) than the second side (94) of the soft protective cover (20),
wherein a distal end (44) of the standing leg (40) is closer to the bottom side (92) of the soft protective cover (20) than a pivoting end (43) of the standing leg (40),
wherein the recess (50) is formed substantially parallel to the first and second sides (93, 94) of the soft protective cover (20),
wherein the predetermined angle (80) is greater than 90 degrees.

18. The case (10) of claim 1, wherein the standing leg (40) is configured to rotate up to about a predetermined angle (80),
wherein the soft protective cover (20) comprises a top side (91), a bottom side (92), a first side (93) and a second side (94),
wherein the top and bottom sides (91, 92) of the soft protective cover (20) face each other, the first and second sides (93, 94) of the soft protective cover (20) face each other, and the first and second sides (93, 94) of the soft protective cover (20) are longer than the top and bottom sides (91, 92) of the soft protective cover (20),
wherein the recess (50) is formed substantially parallel to the top and bottom sides (91, 92) of the soft protective cover (20),
wherein the predetermined angle (80) is smaller than 90 degrees.

19. A case (10) having a standing leg (40) for an electronic device (100), comprising:
a soft protective cover (20) for protecting the electronic device (100) installed therein, covering a back portion (110) of the electronic device (100);
a hard protective frame (30), constructed to removably mount over the soft protective cover (20);
a standing leg (40) for propping up the electronic device (100); and
a recess (50) formed on a back portion (31) of the hard protective frame (30) wherein the standing leg (40) fits in the recess (50) and the standing leg (40) is pivoted with the soft protective cover (20) and the hard protective frame (30),
wherein the standing leg (40) comprises projections protruding from both sides of a pivoting end (43) of the standing leg (40) wherein the projections of the standing leg (40) are pivoted with the soft protective cover (20) and the hard protective frame (30),
wherein the standing leg (40) is constructed to be pivoted with the soft protective cover (20) and the hard protective frame (30) such that installing the electronic device (100) in the case increases resistance to the pivoting of the standing leg (40),
wherein the recess (50) of the hard protective frame (30) comprises a recess bottom (51) and a recess bottom opening (52) which is formed on a bottom of the recess (50) and next to the recess bottom (51), wherein the recess bottom opening (52) is sized to allow insertion of the standing leg (40).

20. The case (10) of claim 19, wherein the projections of the standing leg (40) are respectively received in pivoting grooves (27) of the soft protective cover (20) and pivoting grooves (55) of the hard protective frame (30),
wherein the soft protective cover (20) comprises a pivot opening (25) to receive the pivoting end (43) of the standing leg (40) wherein the pivoting grooves (27) of the soft protective cover (20) are formed on both ends of the pivot opening (25).

21. The case (10) of claim 19,
wherein pivoting grooves (55) of the hard protective frame (30) are formed on both ends of the recess bottom opening (52) to receive the projections of the standing leg (40),
wherein a protrusion (53) corresponding to the recess (50) is formed on a front portion of the hard protective frame (30), and
wherein a protrusion receiving opening (23) is formed on the soft protective cover (20) to receive the protrusion (53).

22. A case (10) having a standing leg (40) for an electronic device (100), comprising:
a soft protective cover (20) for protecting the electronic device (100) installed therein, covering a back portion (110) of the electronic device (100);
a hard protective frame (30), constructed to removably mount over the soft protective cover (20);
a standing leg (40) for propping up the electronic device (100); and a recess (50) formed on a back portion (31) of the hard protective frame (30) wherein the standing leg (40) fits in the recess (50) and the standing leg (40) is pivoted with the soft protective cover (20) and the hard protective frame (30), wherein the recess (50) of the hard protective frame (30) comprises a recess bottom (51) and a recess bottom opening (52) which is formed on a bottom of the recess (50) and next to the recess bottom (51), wherein the recess bottom opening (52) is sized to allow insertion of the standing leg (40), wherein the standing leg (40) comprises a metal pin (45) protruding from both sides of a pivoting end (43) of the standing leg (40) wherein the pin (45) of the standing leg (40) is pivoted with the soft protective cover (20) and the hard protective frame (30), wherein the standing leg (40) is manufactured by an over-molding process in which material is over-molded around the metal pin (45).

\* \* \* \* \*